United States Patent [19]

Mesch et al.

[11] Patent Number: 4,593,059

[45] Date of Patent: Jun. 3, 1986

[54] STABILIZERS FOR HALOGEN-CONTAINING ORGANIC POLYMERS COMPRISING AN ORGANOTIN MERCAPTIDE AND A DIALKYL ESTER OF AN UNSATURATED DICARBOXYLIC ACID

[75] Inventors: Keith A. Mesch; Gary M. Conroy, both of Cincinnati, Ohio

[73] Assignee: Morton Thiokol, Inc., Chicago, Ill.

[21] Appl. No.: 673,470

[22] Filed: Nov. 20, 1984

[51] Int. Cl.[4] .............................................. C08K 5/58
[52] U.S. Cl. ................................... 524/181; 524/180; 524/182; 524/306; 524/311; 524/312; 524/314; 252/400 R
[58] Field of Search ............... 524/180, 181, 182, 306, 524/311, 312, 314

[56] References Cited

U.S. PATENT DOCUMENTS

| | | | |
|---|---|---|---|
| 2,313,757 | 4/1943 | Matheson et al. | 524/314 |
| 2,349,414 | 5/1944 | Ferrer | 260/36 |
| 2,641,588 | 6/1953 | Leistner et al. | 524/182 |
| 2,746,946 | 5/1956 | Weinberg et al. | 524/180 |
| 3,379,679 | 4/1968 | Besso | 524/178 |
| 3,565,930 | 2/1971 | Kauder et al. | 524/181 |
| 3,578,621 | 5/1971 | Stapfer | 524/314 |
| 3,640,950 | 2/1972 | Weisfeld | 524/182 |
| 3,640,953 | 2/1972 | Brecker et al. | 260/45.75 K |
| 3,644,246 | 2/1972 | Lozanou | 260/23 XA |
| 3,679,619 | 7/1972 | Stapfer et al. | 260/23 XA |
| 3,890,277 | 6/1975 | Kugele et al. | 524/180 |
| 3,925,246 | 12/1975 | Coates et al. | 250/400 R |
| 3,933,741 | 1/1976 | Larkin et al. | 524/180 |
| 4,111,889 | 9/1978 | Kaneko et al. | 524/314 |

OTHER PUBLICATIONS

Kopsch, H. "The Effect of Plasticizer Structure on the Thermal Stability of Plasticized PVC Compounds" English Translation of Kunstoffe 67 1977 (3) pp. 141-145.

Luijten et al., "Dialkyltin Compounds . . . As Heat Stabilizers for Polyvinyl Chloride" British Plastics pp. 183-186, May, 1957.

Perry, Norman L. "Stabilization of Rigid PVC for Outdoor Exposure" Modern Plastics, 156, 161, 164 and 202, 1963.

Nass, Leonard et al., "Plastics Additives" 69 Annual State of the Art Report" Plastics Engineers, vol. 15, No. 7, pp. 43-50, Jul., 1969.

*Primary Examiner*—Veronica P. Hoke
*Attorney, Agent, or Firm*—Richard J. Sheridan; Gerald K. White

[57] ABSTRACT

Compositions comprising an organotin mercaptide, organotin sulfide or mixtures thereof; a diester of an ethylenically unsaturated dicarboxylic acid having one carboxyl group on each carbon atom of the ethenylene group; and, optionally, an organotin carboxylate are useful for stabilizing halogen-containing organic polymers against the deteriorative effects of heat, light and weathering.

50 Claims, No Drawings

STABILIZERS FOR HALOGEN-CONTAINING ORGANIC POLYMERS COMPRISING AN ORGANOTIN MERCAPTIDE AND A DIALKYL ESTER OF AN UNSATURATED DICARBOXYLIC ACID

BACKGROUND OF THE INVENTION

1. Field of the Invention

This invention relates to compositions which are capable of stabilizing rigid (unplasticized) halogen-containing organic polymers against the deteriorative effects of heat, light and weathering. Such stabilizers comprise on organotin mercaptide and/or an organotin sulfide, and a dialkyl ester of an ethylenically unsaturated dicarboxylic acid. The invention also relates to halogen-containing organic polymers stabilized with such compositions.

2. Description of the Prior Art

It has long been known that halogen-containing organic polymers, such as the commercially important poly (vinyl chloride), are subject to deterioration or degradation when exposed to heat and light. Various chemical compounds and compositions have been developed to stabilize these polymers against such deterioration. For the most part, these stabilizers have been directed toward stabilization against heat, such as that encountered during processing of the polymer and its fabrication into articles. Among these heat stabilizers, some of the most effective have been the organotin compounds. The organotin compounds which have been found to be effective heat stabilizers for halogen-containing organic polymers include a wide variety of compounds. Mono- and dialkyltin carboxylates and mono- and dialkyltin mercaptides, for example, have been employed successfully as heat stabilizers.

Other organic, non-metallic compounds have also been found to be useful as heat stabilizers for halogen-containing organic polymers and are sometimes employed in combination with the organotin stabilizers. For instance, U.S. Pat. No. 3,379,679 discloses stabilizer compositions containing an organotin maleate of the formula:

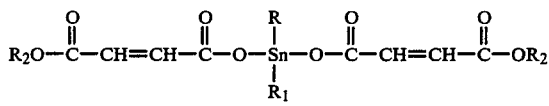

and a maleate ester of the formula:

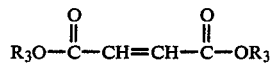

where R, $R_1$ and $R_2$ are each alkyl or alkenyl of up to 12 carbon atoms, or aryl, alkaryl or aralkyl of from 6 to 9 carbon atoms; and $R_3$ is hydrogen, alkyl or alkenyl of up to 12 carbon atoms, or aryl alkaryl or aralkyl of from 6 to 9 carbon atoms, provided that at least one of said $R_3$ is other than hydrogen.

With the increased use of halogen-containing organic polymers for rigid articles which will be exposed to light and weathering for long periods of time (e.g. housing siding and window profiles) it has become increasingly important to develop a stabilizer which will not only protect the polymer against the high temperatures encountered during processing and fabrication, but will also protect the polymer against the long-term effects of light and weathering. However, until the present invention, no single stabilizer composition was completely satisfactory for protecting the halogen-containing organic polymers against heat, light and weathering. Thus, while an organotin compound, and in particular the organotin mercaptides, provided good heat stability, they were not acceptable weathering stabilizers. Likewise, the aforementioned combination of organotin maleates and maleate esters disclosed in U.S. Pat. No. 3,379,679 does not provide adequate heat stability, is incompatible with normally used ingredients employed in commercial polymer formulations (commonly called "microingredients"), such as calcium stearate, and can cause problems with eye irritation and offensive odors due to the presence of the organotin maleate. Thus, the industry has been unable to use organotin maleates as light stabilizers because of the aforementioned problems. Instead, it chooses to use the organotin mercaptides which overcome the problems of eye irritation and incompatibility with microingredients, but which give less than desired weathering and light stabilization.

It has now been quite unexpectedly discovered that the problems encountered with the prior art stabilizers can be overcome while still providing excellent stabilization of halogen-containing organic polymers against heat, light and weathering when stabilizers are employed which comprise organotin sulfides and/or mercaptides in combination with dialkyl esters of ethylenically unsaturated dicarboxylic acids, and, optionally, organotin carboxylates.

SUMMARY OF THE INVENTION

In accordance with the present invention there are provided compositions capable of stabilizing halogen-containing organic polymers against the deteriorative effects of heat, light and weathering, said composition comprising the product produced by combining:

a. an organotin compound or mixture of organotin compounds selected from the group consisting of organotin sulfides, organotin mercaptides and mixtures thereof (hereinafter referred to sometimes as "organotin-sulfur compounds");

b. in an amount sufficient to synergize the stabilization of the halogen-containing organic polymer, but insufficient to plasticize said polymer, a diester of an ethylenically unsaturated dicarboxylic acid having one carboxyl group on each carbon atom of the ethenylene group (hereinafter referred to sometimes simply as "diester"); and, optionally, c. an organotin carboxylate or mixture of organotin carboxylates.

There is also provided in accordance with the present invention a composition comprising a halogen-containing organic polymer and, in an amount sufficient to stabilize said polymer against the deteriorative effects of heat, light and weathering, a stabilizer composition comprising the product produced by combining:

a. an organotin compound or mixture of organotin compounds selected from the group consisting of organotin sulfides, organotin mercaptides and and mixtures thereof;

b. in an amount sufficient to synergize the stabilization of the halogen-containing organic polymer, but insufficient to plasticize said polymer, a diester of an ethylenically unsaturated dicarboxylic acid having one carboxyl group on each carbon atom of the ethenylene group; and, optionally, c. an organotin carboxylate or mixture of organotin carboxylates.

DETAILED DESCRIPTION OF THE PREFERRED EMBODIMENTS

The halogen-containing organic polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha-chloroacrylate, styrene, vinyl ethers such as vinyl ethyl ether, vinyl chloroethyl ether, vinyl phenyl ether; vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfurmarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

The organotin-sulfur compounds useful in the practice of this invention are organotin sulfides, organotin mercaptides and mixtures thereof. The organotin sulfides are compounds which have one or more tetravalent tin atoms which each have at least one direct tin to carbon bond with the remainder of the valences on the tin atom being taken up by sulfur atoms. These organotin sulfides may be further described by the following general formulas:

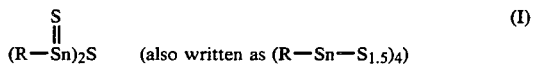  (I)

(R—Sn)$_2$S  (also written as (R—Sn—S$_{1.5}$)$_4$)

R$_2$Sn=S  (also written as (R$_2$SnS)$_3$)  (II)

where R is as defined below.

Examples of organotin sulfides useful in the practice of this invention include, but are not limited to, the following:

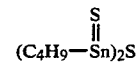

(C$_4$H$_9$—Sn)$_2$S

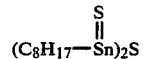

(C$_8$H$_{17}$—Sn)$_2$S (C$_4$H$_9$)$_2$Sn=S (C$_8$H$_{17}$)$_2$Sn=S

The organotin mercaptides useful in this invention are compounds which have at least one tetravalent tin atom which has one or two direct tin to carbon bond and at least one tin to sulfur to carbon (Sn—S—C) bond. These organotin mercaptides may be further described by the following general formulas:

R—Sn—X  (III)
‖
W

R$_n$—Sn—X$_p$ and  (IV)

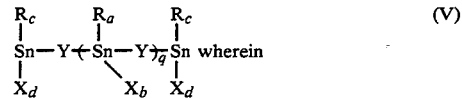  (V)

X is at each independent occurrence selected from

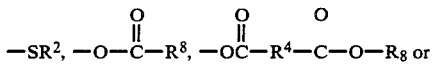

—SR$^2$, —O—C(=O)—R$^8$, —OC(=O)—R$^4$—C(=O)—O—R$_8$ or

—O—C(=O)—R$^4$—C(=O)—O—R$^3$—O—R$^8$ with the proviso that; (1) at least one X in formulas III and IV is —SR$^2$ and (2) in formula V at least one X is —SR$^2$ or at least one Y is —S—R$^3$—W

—S—R$^4$—C(=O)—O—,

—S—R$^4$—C(=O)—O—R$^3$—O—C(=O)—R$^4$—S—, or

—S—R$^3$—O—C(=O)—R$^4$—S—, or

—S—R$^3$—OC(=O)—R$^6$—C(=O)—O—R$^3$—S—;

Y is at each independent occurrence selected from

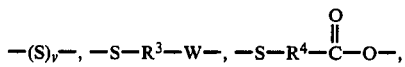

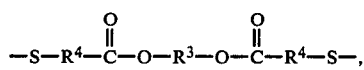

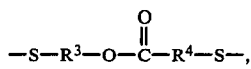

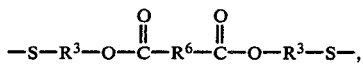

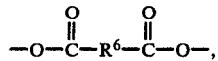

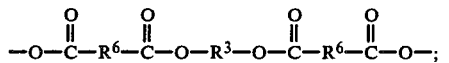

W is at each independent occurrence selected from oxygen or sulfur;

R is at each independent occurrence selected from alkyl, alkenyl, cycloalkyl, cycloalkenyl,

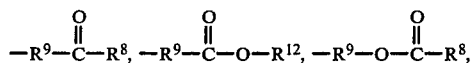

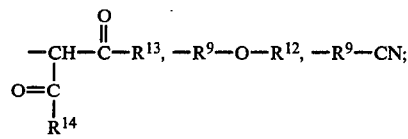

$R^2$ is at each independent occurrence selected from alkyl, alkenyl, cycloalkyl, cycloalkenyl,

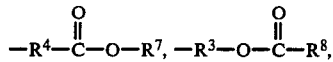

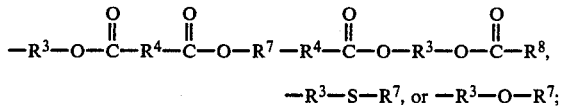

$R^3$ is at each independent occurrence selected from alkylene of at least 2 carbon atoms, alkenylene of at least 2 carbon atoms, cycloalkylene, or cycloalkenylene;

$R^4$ is at each independent occurrence selected from alkylene, alkenylene, cycloalkylene, or cycloalkenylene;

$R^6$ is at each independent occurrence selected from a carbon-carbon bond, or $R^4$;

$R^7$ is at each independent occurrence selected from —H or $R^8$;

$R^8$ is at each independent occurrence selected from alkyl, alkenyl, cycloalkyl, or cycloalkenyl;

$R^9$ is at each independent occurrence selected from $C_1$ to $C_4$ alkylene;

$R^{12}$ is at each independent occurrence selected from —H or a monovalent $C_1$ to $C_{20}$ hydrocarbon radical;

$R^{13}$ and $R^{14}$ are at each independent occurrence selected from $C_1$ to $C_{20}$ alkyl or $C_1$ to $C_{20}$ alkoxy;

at each independent occurrence $n=1$ or 2 and $p=4-n$;

at each independent occurrence $a=1$ or 2; $b=2-a$; $c=1$ or 2; $d=3-c$; and $q=0$ or an integer from 1 to 4 inclusive; and v is at each independent occurrence selected from an integer from 1 to 8 inclusive.

In the above formulas, it is understood that formula V includes those organotin mercaptides which are cyclic, i.e. where formulas V would be written:

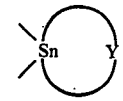

or

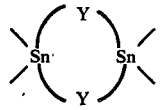

Examples of organotin mercaptides useful in the practice of this invention include, but are not limited to:

(1) alkyltin alkylthioalkanoates, including monoalkyltin tris(alkylthioalkanoates) and dialkyltin bis(alkylthioalkanoates), such as

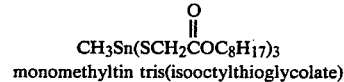
monomethyltin tris(isooctylthioglycolate)

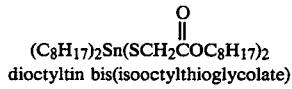
dioctyltin bis(isooctylthioglycolate)

monobutyltin tris(isooctylthioglycolate)

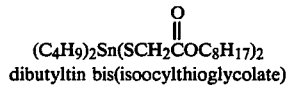
dibutyltin bis(isoocylthioglycolate)

(2) alkyltin mercaptoalkylalkanoates, including the monoalkyltin tris(mercaptoalkylalkanoates) and dialkyltin bis(mercaptoalkylalkanoates), such as

monomethyltin tris(mercaptoethyloleate)

dimethyltin bis(mercaptoethyloleate)

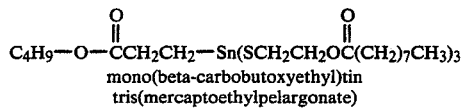
mono(beta-carbobutoxyethyl)tin tris(mercaptoethylpelargonate)

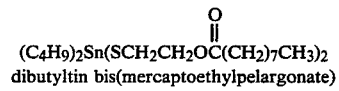
dibutyltin bis(mercaptoethylpelargonate)

(3) bis(alkyltin alkylthioalkanoate) sulfides, including the bis(monoalkyltin di(alkylthioalkanoate))sulfides and bis(dialkyltin mono(alkylthioalkanoate))sulfides, such as

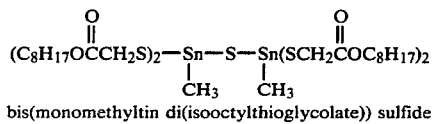
bis(monomethyltin di(isooctylthioglycolate)) sulfide

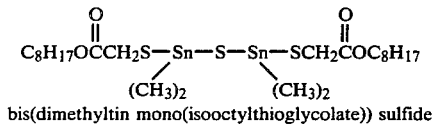
bis(dimethyltin mono(isooctylthioglycolate)) sulfide

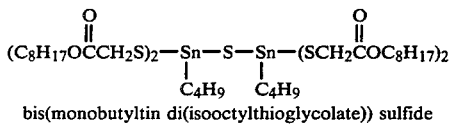
bis(monobutyltin di(isooctylthioglycolate)) sulfide

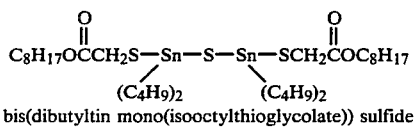
bis(dibutyltin mono(isooctylthioglycolate)) sulfide (4) bis(alkyltin mercaptoalkylalkanoate)sulfides, including bis(monoalkyltin di(mercaptoalkylalkanoate))-sulfides and bis(dialkyltin mono(mercaptoalkylalkanoate))sulfides, such as

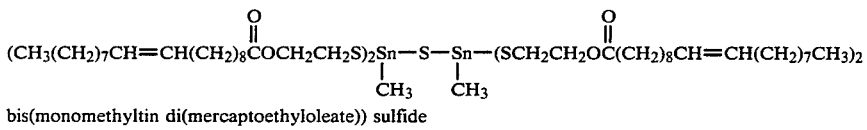
bis(monomethyltin di(mercaptoethyloleate)) sulfide

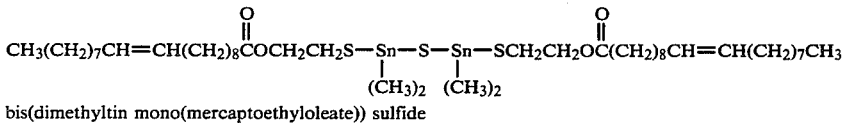
bis(dimethyltin mono(mercaptoethyloleate)) sulfide

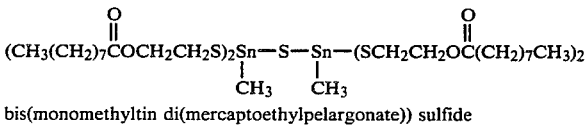
bis(monomethyltin di(mercaptoethylpelargonate)) sulfide

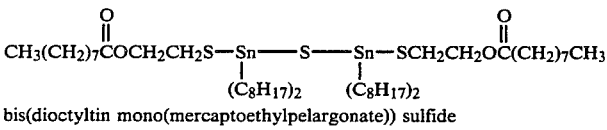
bis(dioctyltin mono(mercaptoethylpelargonate)) sulfide (5) alkyltin alkylmercaptides, including monalkyltin tris(alkylmercaptides) and dialkyltin bis(alkylmercaptides) such as $$CH_3-Sn(SC_{12}H_{23})_3$$
monomethyltin tris(lauryl mercaptide)
$$(CH_3)_2-Sn(SC_{12}H_{23})_2$$
dimethyltin bis(lauryl mercaptide)
$$C_4H_9-Sn(SC_{12}H_{23})_3$$
monobutyltin tris(lauryl mercaptide)
$$(C_4H_9)_2-Sn(SC_{12}H_{23})_2$$
dibutyltin bis(lauryl mercaptide)

Particularly useful in the practice of this invention are mixtures of monoalkyltin and dialkyltin mercaptides.

The compounds employed in combination with the above-described organotin-sulfur compounds in the practice of this invention are diesters of ethylenically unsaturated dicarboxylic acids having one carboxyl group on each carbon atom of the ethenylene group. These diesters are represented by compounds having the formula:

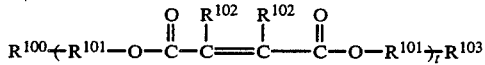

where
$R^{100}$ and $R^{103}$ are the same or different and are at each independent occurrence alkyl, alkenyl, cycloalkyl, cycloalkenyl, or a multivalent hydrocarbyl or hydroxyl-substituted hydrocarbyl group such as alkylene, alkenylene, cycloalkylene, cycloalkenylene, alkynylene or tetravalent carbon;

$R^{101}$ is at each independent occurrence a carbon-oxygen bond, alkylene or alkenylene;

$R^{102}$ is at each independent occurrence selected from hydrogen, alkyl and alkylene (i.e. the alkylene group forms a ring with the —C=C— group); and t is an integer, preferably from 1 to about 20.

It should be noted that the diesters useful in this invention include both the cis and trans isomers.

Examples of the diesters according to formula VI which are useful in this invention include, but are not limited to, the following compounds which are identified by both chemical name (or structure) and by the substituents in formula (VI):

|  | $R^{100}$ | $R^{101}$ | $R^{102}$ | $R^{103}$ | t |
|---|---|---|---|---|---|
| dioctyl maleate | $C_8H_{17}-$ | — | —H | $-C_8H_{17}$ | 1 |
| dibutyl maleate | $C_4H_9-$ | — | —H | $-C_4H_9$ | 1 |

-continued

| | $R^{100}$ | $R^{101}$ | $R^{102}$ | $R^{103}$ | t |
|---|---|---|---|---|---|
| di(2-ethylhexyl) maleate | $C_4H_9CHCH_2-$<br>$\quad\quad\quad\mid$<br>$\quad\quad\quad C_2H_5$ | — | —H | $C_4H_9-CHCH_2-$<br>$\quad\quad\quad\quad\mid$<br>$\quad\quad\quad\quad C_2H_5$ | 1 |
| methyl lauryl maleate | $CH_3-$ | — | —H | $-C_{12}H_{23}$ | 1 |
| dibutyl tetrahydrophthalate | $C_4H_9-$ | — | $-(CH_2)_4-$ | $-C_4H_9$ | 1 |
| methyl cyclohexyl maleate | $CH_3-$ | — | —H | —⟨cyclohexyl⟩ | 1 |
| diallyl maleate | $CH_2=CH-CH_2-$ | — | —H | $-CH_2-CH=CH_2$ | 1 |
| methyl oleyl maleate | $CH_3-$ | — | —H | $-(CH_2)_8CH=CH(CH_2)_7CH_3$ | 1 |
| octyl methyl maleate | $C_8H_{17}-$ | — | —H | $-CH_3$ | 1 |
| butyl octyl maleate | $C_4H_9-$ | — | —H | $-C_8H_{17}$ | 1 |
| diisoctyl maleate | $C_8H_{17}-$ | — | —H | $-C_8H_{17}$ | 1 |
| butyl (2-ethylhexyl) maleate | $C_4H_9-$ | — | —H | $-CH_2CH-C_4H_9$<br>$\quad\quad\mid$<br>$\quad\quad C_2H_5$ | 1 |
| dimethyl maleate | $CH_3-$ | — | —H | $-CH_3$ | 1 |
| bis(butylmaleate) glycerate | $-CH-$<br>$\;\;\mid$<br>$\;\;OH$ | $-CH_2-$ | —H | $-C_4H_9$ | 2 |
| bis(butylmaleate) ethyleneglycolate | $-CH_2CH_2-$ | — | —H | $-C_4H_9$ | 2 |
| bis(butylmaleate) butyleneglycolate | $-(CH_2)_4-$ | — | —H | $-C_4H_9$ | 2 |
| bis(methylmaleate) butyleneglycolate | $-(CH_2)_4-$ | — | —H | $-CH_3$ | 2 |
| bis(allylmaleate) butyleneglycolate | $-(CH_2)_4-$ | — | —H | $-CH_2CH=CH_2$ | 2 |
| $C-(CH_2O\overset{O}{\overset{\|}{C}}CH=CH\overset{O}{\overset{\|}{C}}OCH_3)_4$ | $-\overset{\|}{\underset{\|}{C}}-$ | $-CH_2-$ | —H | $-CH_3$ | 4 |
| $C_2H_5-C(CH_2O\overset{O}{\overset{\|}{C}}CH=CHCOC_4H_9)_3$<br>$\quad\quad\quad\quad\quad\quad\quad\quad\;\;\overset{\|}{O}$ | $C_2H_5-\overset{\|}{\underset{\|}{C}}-$ | $-CH_2-$ | —H | $-C_4H_9$ | 3 |
| $CH_2OH\;\;\;O\quad\quad\;\;O$<br>$\;\;\mid\quad\quad\;\;\|\quad\quad\;\;\|$<br>$C(CH_2OCCH=CHCC_8H_{17})_2$<br>$\;\;\mid$<br>$CH_2OH$ | $HOCH_2-C-$<br>$\quad\quad\;/$<br>$\;\;HOCH_2$ | $-CH_2$ | —H | $-C_8H_{17}$ | 2 |
| $OH\;\;\;O\quad\quad\;O$<br>$\;\mid\quad\;\;\|\quad\quad\;\|$<br>$CH(CH_2OCCH=CHCOC_2H_5)_2$ | $HO-CH-$ | $-CH_2-$ | —H | $-C_2H_5$ | 2 |
| $\quad\;O\quad\quad\;O\quad\quad\;O$<br>$\quad\;\|\quad\quad\;\|\quad\quad\;\|$<br>$CH_3OCCH=CHCOCH_2OCCH$<br>$\quad\quad\quad\quad\quad\quad\quad\quad\;\;\overset{\|}{CH}$<br>$\quad\quad\quad\quad\quad\quad\quad\quad\;\;\overset{\|}{C=O}$<br>$\quad\quad\quad\quad\quad\quad\quad\quad\;\;\overset{\|}{O}$<br>$\quad\quad\quad\quad\quad\quad\quad\quad\;\;CH_3$ | $-CH_2-$ | — | —H | $-CH_3$ | 2 |

Further examples include the fumarate counterparts to the above maleate diesters. Mixtures of maleate and fumarate diesters (which are commonly formed during the preparation of these diesters) may also be employed.

The organotin carboxylates which may be employed in accordance with this invention are compounds which have tetravalent tin atoms which each have one or two direct tin to carbon bonds, the remainder of the bonds on the tin atoms being tin to oxygen to carbonyl, i.e. tin-carboxyl

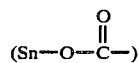

bonds. These organotin carboxylates may be further described by the following general formulas:

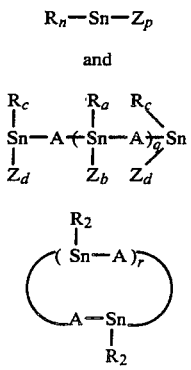

wherein
R, n, p, a, b, c, d and q are as previously defined;

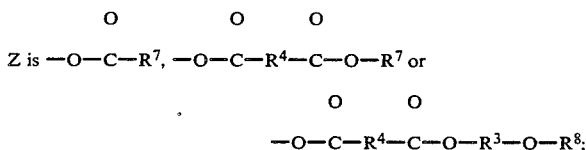

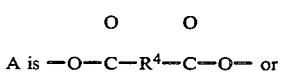

$R^3$, $R^4$, $R^7$ and $R^8$ are as previously defined; and $r=0$ or an integer, preferably about 1–20.

Examples of organotin carboxylates which are useful in the practice of this invention include, but are not limited to, alkyltin alkyl maleates, such as dibutyltin bis(butyl maleate), and polymeric alkyltin maleates, such as dibutyltin maleate.

As used in the above formulas and throughout this specification, the term alkyl represents monovalent, straight or branched chain, saturated hydrocarbon radicals containing, for example, 1 to 20 carbon atoms, the term alkylene refers to divalent, straight or branched chain saturated hydrocarbon radicals containing, for example, 1 to 20 carbon atoms and the term alkynylene refers to trivalent straight or branched chain saturated hydrocarbon radicals containing, for example, 1 to 20 carbon atoms. The term alkenyl refers to monovalent, straight or branched chain $C_2$ to $C_{20}$ hydro-carbon radicals containing at least one double bond, and the term alkenylene refers to divalent $C_2$ to $C_{20}$ hydrocarbon radicals containing at least one double bond. The term cycloalkyl represents monovalent $C_3$–$C_8$ saturated cycloaliphatic radicals; cycloalkylene refers to divalent $C_3$–$C_8$ cycloaliphatic radicals containing at least one double bond; cycloalkenyl refers to monovalent $C_5$–$C_8$ cycloaliphatic radicals containing at least one double bond; and cycloalkenylene represents divalent $C_5$–$C_8$ cycloaliphatic radicals containing at least one double bond.

The amount of organotin-sulfur compound, diester of ethylenically unsaturated dicarboxylic acid and, when employed, organotin carboxylate in the stabilizer compositions of this invention will depend upon several factors, including, but not limited to, the particular organotin-sulfur compound, diester and organotin carboxylate employed, the particular resin which is intended to be stabilized, the severity of the heat, light and weathering to which the resin will be subjected and the degree of stabilization desired. Thus, the amount of organotin-sulfur compound, diester and organotin carboxylate may vary considerably, it being required only that the stabilizer composition contain enough of each component to stabilize a halogen-containing organic polymer against the deteriorative effects of heat, light and weathering, and that the diester be present in an amount which will synergize such stabilization while at the same time being insufficient to plasticize the polymer.

In general, the stabilizer compositions in accordance with this invention which contain an organotin-sulfur compound and diester employ these compounds in a molar ratio of organotin-sulfur compound to diester (organotin-sulfur compound/diester) of from about 2/1 to about 1/8, preferably from about 1/2 to about 1/6. This corresponds to a stabilizer composition which contains roughly from about 20% to about 75% diester, with the balance being organotin-sulfur compound, the percentages being by weight based on the combined weight of the diester and organotin-sulfur compound. These weight percentages may, of course, vary considerably depending upon the particular compounds selected and their molecular weights.

When the stabilizer compositions in accordance with this invention employ an organotin carboxylate, the amount of diester used is normally the same as that employed when the organotin-sulfur compound and diester are used alone. Thus, the molar ratio of organotin compounds (i.e. organotin-sulfur compound plus organotin carboxylate) to diester would remain about 2/1 to about 1/8, preferably about 1/2 to about 1/6. However, the molar ratio of organotin-sulfur compound to organotin carboxylate (organotin-sulfur compound/organotin carboxylate) will generally be from about 1/1 to about 1/5. In terms of weight percent, the stabilizer would contain roughly about 15% to about 60% diester with the balance being organotin-sulfur compound and organotin carboxylate, the percentages being by weight based on the combined weight of diester, organotin-sulfur compound and organotin carboxylate. The organotin portion of the stabilizer, would contain about 10% to about 50% organotin-sulfur compound and about 50% to about 90% organotin carboxylate, in this case the percentages being by weight based on the combined weight of only the organotin-sulfur compound and organotin carboxylate.

As with the relative amounts of organotin-sulfur compounds, diester and organotin carboxylate, the amount of stabilizer composition employed in the halogen-containing organic polymer compositions of this invention can vary considerably. The minimum amount of stabilizer in the polymer composition is that amount which will stabilize the polymer against the deteriorative effects of heat, light and weathering. While this minimum amount can vary depending upon the same factors referred to above with respect to the stabilizer compositions, in general about 1.0% to about 5.0% of stabilizer composition based on the weight of halogen-containing organic polymer will be sufficient to impart the desired properties to the polymer composition in most cases. Amounts greater than this minimum level of stabilizer can, of course, be employed, although at some point the increase in stabilization of the polymer is not commensurate with the additional amount of stabilizer employed. Thus, while there is no critical upper limit to the amount of stabilizer which may be employed, amounts in excess of about 8% do not give an increase in effectiveness which will justify the use of these higher amounts of stabilizer. In fact, amounts above about 8-10% of stabilizer composition may begin to plasticize the polymer and change its physical properties dramatically.

The stabilizer compositions of this invention can be made quite simply. For example, the organotin-sulfur compounds, diester and, if used, organotin carboxylate can be simply combined physically as by mixing, blending, stirring, shaking or the like. Likewise, the halogen-containing organic polymer compositions of this invention may be prepared by physically blending the stabilizer composition and the polymer (plus any desired additives) in any convenient manner until the stabilizer composition is thoroughly dispersed throughout the polymer composition. In normal commercial practice this is accomplished by high intensity mixing.

The stabilized polymer compositions of this invention are useful to form a variety of rigid articles of manufacture, e.g. housing siding, window profiles and the like, and are especially useful in those articles which are exposed to light and weathering. A variety of conventional techniques may be employed to shape the polymer composition into the desired article.

The following examples illustrate the present invention. Unless otherwise indicated, all parts and percentages in the examples and throughout this specification are by weight.

EXAMPLE 1-6

The stabilizer compositions indicated in Table I were each in turn blended with a standard poly (vinyl chloride) formulation containing:

| INGREDIENT | PARTS BY WEIGHT |
|---|---|
| Poly (vinyl chloride)-Geon 103 EP sold by B. F. Goodrich (K = 68) | 100.0 |
| Process aid | 1.5 |
| Impact modifier | 6.0 |
| Pigment | Approx. 1.0 |
| Paraffin wax | 1.2 |
| Partially oxidized polyethylene | 0.25 |

Each resulting polymer composition was then formed into a plaque and tested for stability to light and weathering by exposing it to ultraviolet light (UV) and moisture in a Q-Panel QUV accelerated weathering tester. Each plaque was weathered at 50° C. by exposing it to 4 hours of UV followed by 4 hours of a moisture condensation cycle. This was repeated until the plaque had been exposed for 750 hours, samples being taken for evaluation every 150 hours. The results of these tests are summarized in Table I.

TABLE I

| EX. NO. | STABILIZER COMPOSITION[a] | PHR[b] | TIME (hrs) WEATHERING RESULTS (Color)[c] | | | | | |
|---|---|---|---|---|---|---|---|---|
| | | | 0 | 150 | 300 | 450 | 600 | 750 |
| Control 1 | mixture of $CH_3Sn(IOTG)_3$ (20%) and $(CH_3)_2Sn(IOTG)_2$ (80%) (hereinafter referred to as "Stab. A") | 1.5 | 10 | 5 | 3 | 2 | 1 | 1 |
| Ex. No. 1a | Stab. A<br>dibutyl maleate | 1.5<br>2.0 | 10 | 8 | 6 | 5 | 4 | 4 |
| Ex. No. 1b | Stab. A<br>dioctyl maleate | 1.5<br>3.0 | 10 | 8 | 7 | 6 | 4 | 4 |
| Ex. No. 1c | Stab. A<br>diallyl maleate | 1.5<br>2.0 | 10 | 8 | 6 | 5 | 5 | 4 |
| Ex. No. 1d | Stab. A<br>bis(butylmaleate)ethyleneglycolate | 1.5<br>1.1 | 10 | 8 | 6 | 5 | 4 | 4 |
| Ex. No. 1e | Stab. A<br>bis(butylmaleate)butyleneglycolate | 1.5<br>1.1 | 10 | 8 | 7 | 6 | 5 | 4 |
| Ex. No. 1f | Stab. A<br>bis(allylmaleate)butyleneglycolate | 1.5<br>1.1 | 10 | 8 | 7 | 6 | 4 | 4 |
| Control 2 | mixture of $CH_3\!-\!Sn\!-\!S\!-\!Sn\!-\!CH_3$ (70%) and $(MEP)_2$ $(MEP)_2$ $(CH_3)_2\!-\!Sn\!-\!S\!-\!Sn\!-\!(CH_3)_2$ (30%) $(MEP)$ $(MEP)$ (hereinafter referred to as "Stab. B") | 1.2 | 10 | 4 | 3 | 1 | 1 | 1 |
| Ex. No. 2 | Stab. B<br>dibutyl maleate | 1.2<br>2.0 | 10 | 7 | 6 | 5 | 4 | 4 |
| Control 3 | mixture of $CH_3\!-\!Sn\!-\!S\!-\!Sn\!-\!CH_3$ (70%) $(IOTG)_2$ $(IOTG)_2$ and $(CH_3)_2\!-\!Sn\!-\!S\!-\!Sn\!-\!(CH_3)_2$ (30%) $(IOTG)$ $(IOTG)$ (hereinafter referred to as "Stab. C") | 1.5 | 10 | 5 | 3 | 2 | 1 | 1 |

TABLE I-continued

| EX. NO. | STABILIZER COMPOSITION[a] | PHR[b] | TIME (hrs) WEATHERING RESULTS (Color)[c] | | | | | |
|---|---|---|---|---|---|---|---|---|
| | | | 0 | 150 | 300 | 450 | 600 | 750 |
| Ex. No. 3 | Stab. C | 1.5 | 10 | 8 | 6 | 5 | 5 | 4 |
| | dibutyl maleate | 2.0 | | | | | | |
| Control 4 | dibutyltin butyl maleate (hereinafter referred to as "Stab. D") | 2.5 | 8 | 9 | 9 | 7 | 5 | 5 |
| Control 4a | Stab. D | 2.5 | 8 | 9 | 9 | 8 | 6 | 5 |
| | dibutyl maleate | 4.0 | | | | | | |
| Control 5 | Stab. D | 2.0 | 10 | 9 | 6 | 5 | 4 | 4 |
| | Stab. A | 0.5 | | | | | | |
| Ex. No. 5a | Stab. D | 2.0 | 10 | 10 | 9 | 8 | 7 | 6 |
| | Stab. A | 0.5 | | | | | | |
| | dibutyl maleate | 2.0 | | | | | | |
| Ex. No. 5b | Stab. D | 2.0 | 10 | 10 | 9 | 9 | 8 | 8 |
| | Stab. A | 0.5 | | | | | | |
| | dibutyl maleate | 6.0 | | | | | | |
| Ex. No. 5c | Stab. D | 2.0 | 10 | 10 | 9 | 7 | 5 | 5 |
| | Stab. A | 0.5 | | | | | | |
| | dibutyl maleate | 0.5 | | | | | | |
| Ex. No. 5d | Stab. D | 2.0 | 10 | 10 | 9 | 7 | 5 | 4 |
| | Stab. A | 0.5 | | | | | | |
| | bis(butylmaleate)glycerate | 1.8 | | | | | | |
| Ex. No. 5e | Stab. D | 2.0 | 10 | 10 | 9 | 7 | 5 | 5 |
| | Stab. A | 0.5 | | | | | | |
| | bis(butylmaleate)butyleneglycolate | 1.5 | | | | | | |
| Ex. No. 5f | Stab. D | 2.0 | 10 | 10 | 8 | 7 | 5 | 5 |
| | Stab. A | 0.5 | | | | | | |
| | dioctyl maleate | 2.0 | | | | | | |
| Ex. No. 5g | Stab. D | 2.0 | 10 | 10 | 7 | 6 | 5 | 4 |
| | Stab. A | 0.5 | | | | | | |
| | methyl oleyl maleate | 3.0 | | | | | | |
| Ex. No. 5h | Stab. D | 2.0 | 10 | 10 | 9 | 8 | 7 | 6 |
| | Stab. A | 0.5 | | | | | | |
| | dibutyl fumarate | 2.0 | | | | | | |
| Ex. No. 5i | Stab. D | 2.0 | 10 | 10 | 9 | 8 | 7 | 6 |
| | Stab. A | 0.5 | | | | | | |
| | octyl methyl maleate | 2.1 | | | | | | |
| Control 6 | Stab. D | 2.0 | 10 | 10 | 9 | 7 | 5 | 5 |
| | dibutyltin lauryl mercaptide (hereinafter referred to as "Stab. E") | 0.6 | | | | | | |
| Ex. No. 6 | Stab. D | 2.0 | 10 | 10 | 10 | 9 | 7 | 7 |
| | Stab. E | 0.6 | | | | | | |
| | dibutyl maleate | 2.0 | | | | | | |

[a]In the formulas for the organotin-sulfur compounds, IOTG is isooctyl thioglycolate and MEP is mercaptoethyl pelargonate
[b]Parts per hundred parts PVC

[c]Color is rated on the scale 10 ⟶ 5 ⟶ 1
               white    tan    brown

The above results demonstrate that:

1. Organotin-sulfur compounds are poor weathering stabilizers. For instance Control 1, Control 2 and Control 3 discolor severely after only about 150 hours.
2. Organotin carboxylates are adequate weathering stabilizers as demonstrated in Control 4.
3. The weathering stabilization of organotin carboxylates is improved only slightly, if at all, by their use in combination with diesters. (Control 4a shows very little improvement over Control 4.)
4. Stabilizers containing organotin-sulfur compounds and diesters provide excellent weathering stability. This excellent stabilization, as shown in Ex. No. 1a–1f, Ex. No. 2 and Ex. No. 3, is quite unexpected in view of the poor weathering efficiency of the organotin-sulfur compounds alone and the failure of the diesters to significantly improve the efficiency of the organotin carboxylates.
5. Stabilizers containing organotin-sulfur compounds, diesters and organotin carboxylates also exhibit excellent weathering stabilization (see Control 5 vs. Ex. No. 5a–5i and Control 6 vs. Ex. No. 6). The excellent stabilization provided by these compositions is surprising in that they contain an ingredient known to exhibit poor weathering stabilization, i.e. the organotin-sulfur compound. Thus, one would expect this three component system to perform worse than the organotin carboxylate/diester stabilizer. However, precisely the opposite occurs. When some of the organotin carboxylate of Controls 5 and 6 is replaced with organotin-sulfur compound, the weathering efficiency, rather than decreasing as expected, improves dramatically.

EXAMPLES I–VII

The stabilizer compositions indicated in Table II were each in turn blended with the same standard poly (vinyl chloride) formulation used for the weathering stability tests.

Each resulting polymer composition was then tested for stability to heat by milling on a two roll dynamic mill at about 180° C. Samples of each composition were taken after every 2 minutes of milling and examined for degradation and discoloration. The results are indicated in Table II.

| EXAMPLE | STABILIZER COMPOSITION | PHR | Time (mins) | | | | | | | | | | | | |
|---|---|---|---|---|---|---|---|---|---|---|---|---|---|---|---|
| | | | 2 | 4 | 6 | 8 | 10 | 12 | 14 | 16 | 18 | 20 | 22 | 24 | 26 | 28 |
| Control I | Stab. A | 1.5 | 10 | 10 | 10 | 10 | 10 | 9 | 9 | 8 | 8 | 8 | 7 | 5 | 3 | 1 |
| Example I | Stab. A | 1.5 | 10 | 10 | 10 | 10 | 10 | 9 | 9 | 8 | 8 | 8 | 7 | 5 | 4 | 2 |
| | dibutyl maleate | 2.0 | | | | | | | | | | | | | | |
| Control II | Stab. B | 1.2 | 10 | 10 | 10 | 9 | 9 | 8 | 6 | 4 | 1 | — | — | — | — | — |
| Example II | Stab. B | 1.2 | 10 | 10 | 10 | 9 | 9 | 8 | 6 | 4 | 1 | — | — | — | — | — |
| | dibutyl maleate | 2.0 | | | | | | | | | | | | | | |
| Control III | Stab. C | 1.5 | 10 | 10 | 10 | 9 | 9 | 9 | 8 | 8 | 8 | 6 | 5 | 2 | 1 | — |
| Control* III' | Stab. C | 1.5 | 9 | 9 | 9 | 8 | 8 | 8 | 7 | 7 | 7 | 7 | 6 | 5 | 3 | 2 |
| Example III | Stab. C | 1.5 | 10 | 10 | 10 | 10 | 10 | 9 | 9 | 8 | 8 | 6 | 5 | 2 | 1 | — |
| | dibutyl maleate | 2.0 | | | | | | | | | | | | | | |
| Example* III' | Stab. C | 1.5 | 9 | 9 | 9 | 8 | 8 | 7 | 7 | 7 | 6 | 6 | 5 | 2 | 1 | — |
| | dibutyl maleate | 2.0 | | | | | | | | | | | | | | |
| Control IV | dibutyltin bis(butyl maleate) (hereinafter referred to as "Stab. D") | 1.5 | 8 | 7 | 6 | 6 | 5 | 5 | 4 | 2 | 1 | — | — | — | — | — |
| Control* IV' | Stab. D | 1.5 | 8 | 5 | 4 | 3 | 1 | 1 | — | — | — | — | — | — | — | — |
| Control V | Stab. D | 1.5 | 8 | 7 | 6 | 6 | 5 | 5 | 5 | 3 | 2 | 1 | — | — | — | — |
| | dibutyl maleate | 2.0 | | | | | | | | | | | | | | |
| Control* V' | Stab. D | 1.5 | 8 | 5 | 4 | 3 | 1 | <1 | — | — | — | — | — | — | — | — |
| | dibutyl maleate | 2.0 | | | | | | | | | | | | | | |
| Example V | Stab. D | 1.0 | 10 | 10 | 9 | 9 | 8 | 7 | 6 | 5 | 4 | 3 | 2 | — | — | — |
| | Stab. A | 0.5 | | | | | | | | | | | | | | |
| | dibutyl maleate | 2.0 | | | | | | | | | | | | | | |
| Example* V' | Stab. D | 1.0 | 8 | 7 | 7 | 6 | 5 | 5 | 4 | 3 | 2 | 1 | — | — | — | — |
| | Stab. A | 0.5 | | | | | | | | | | | | | | |
| | dibutyl maleate | 2.0 | | | | | | | | | | | | | | |
| Control VI | Stab. D | 1.0 | 10 | 10 | 9 | 9 | 8 | 8 | 7 | 6 | 5 | 4 | 3 | — | — | — |
| | Stab. E | 0.6 | | | | | | | | | | | | | | |
| Example VI | Stab. D | 1.0 | 10 | 10 | 9 | 9 | 8 | 8 | 7 | 6 | 5 | 4 | 3 | — | — | — |
| | Stab. E | 0.6 | | | | | | | | | | | | | | |
| | dibutyl maleate | 2.0 | | | | | | | | | | | | | | |

*The standard poly(vinyl chloride) formulation contained 1.0 part calcium stearate.

The heat stability results shown in Table II demonstrate that:

1. Organotin-sulfur compounds are excellent heat stabilizers (see Controls I, II and III).
2. Employing diesters with organotin-sulfur compounds does not adversely effect nor improve the organotin-sulfur compounds' heat stabilizing efficiency. (See Examples I, II, III and III').
3. Organotin carboxylates are extremely inefficient heat stabilizers as demonstrated in Control IV. Also, when the organotin carboxylates are employed in PVC formulations containing calcium stearate (a common ingredient in such formulations) their efficiency decreases even further (see Control IV').
4. The use of diesters with the organotin carboxylates does not significantly improve the organotin carboxylates' heat stabilization in PVC formulations which do not contain calcium stearate (see Control V) or for those formulations which do contain calcium stearate (see Control V').
5. Unexpectedly, the addition of the organotin carboxylate to a stabilizer containing an organotin-sulfur compound and a diester still produces a stabilizer composition which yields acceptable heat stability. This is surprising in view of the extremely poor efficiency of the organotin carboxylate and the fact that a portion of the efficient organotin-sulfur compound is replaced by the inefficient organotin carboxylate (see Example I vs. Examples V and V').

To summarize the results of Tables I and II, no synergism in either weathering or heat stabilization is observed for compositions containing organotin carboxylates and diesters. Synergism in weathering stability is, however, evident in those stabilizers containing organotin-sulfur compounds and diesters. Likewise, synergism has been found in both weathering and heat stability for compositions containing orgnotin-sulfur compounds, diesters and organotin carboxylates. These cases of synergism are unexpected since at least one of the compounds used in the synergized compositions are very inefficient stabilizers, yet their addition to the stabilizer system produces markedly superior results.

We claim:

1. A composition capable of stabilizing halogen-containing organic polymers against the deteriorative effects of heat, light and weathering, said composition comprising the product produced by combining:
    A. an organotin compound or mixture of organotin compounds selected from the group consisting of organotin sulfides, organotin mercaptides and mixtures thereof; and
    B. in an amount sufficient to synergize the stabilization of the halogen-containing organic polymer but insufficient to plasticize said polymer, a diester of an ethylenically unsaturated dicarboxylic acid having one carboxyl group on each carbon atom of the ethenylene group and 1 to 10 carbon atoms in the alcohol portion of the ester moieties.

2. The composition of claim 1 wherein the organotin compound is an organotin sulfide or mixture of organotin sulfides having the formula:

where R is at each independent occurrence selected from alkyl, alkenyl, cycloalkyl, cycloalkenyl,

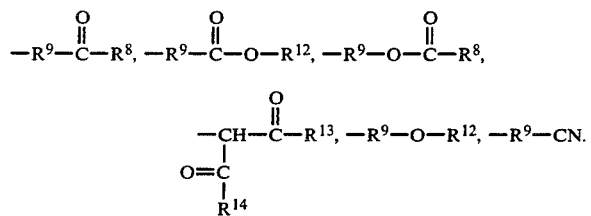

3. The composition of claim 1 wherein the organotin compound is an organotin mercaptide or mixture of organotin mercaptides having the formula:

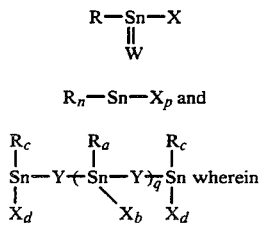

X is at each independent occurrence selected from

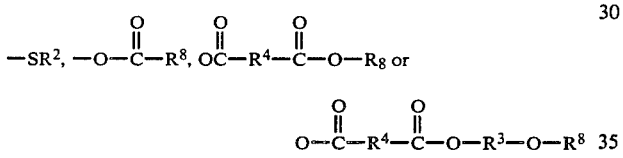

with the proviso that; (1) at least one X in formulas III and IV is —SR$^2$ and (2) in formula V at least one X is —SR$^2$ or at least one Y is —S—R$^3$—W

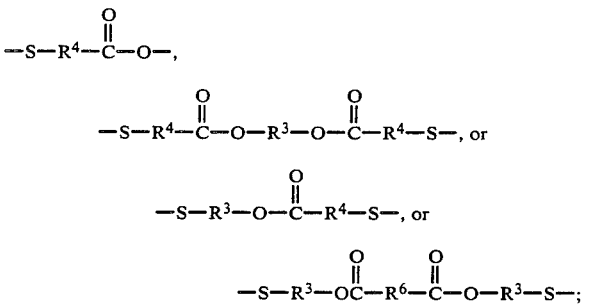

Y is at each independent occurrence selected from

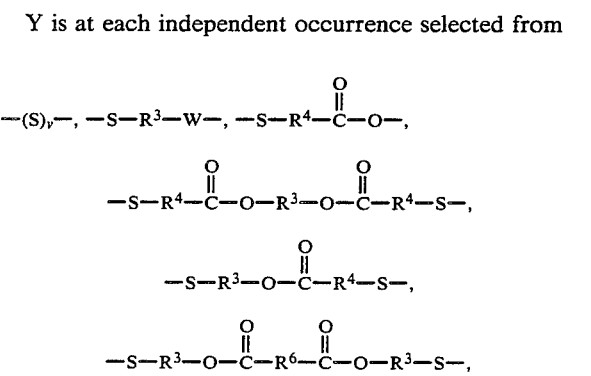

-continued

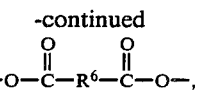

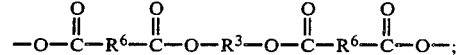

W is at each independent occurrence selected from oxygen or sulfur;

R is at each independent occurrence selected from alkyl, alkenyl, cycloalkyl, cycloalkenyl,

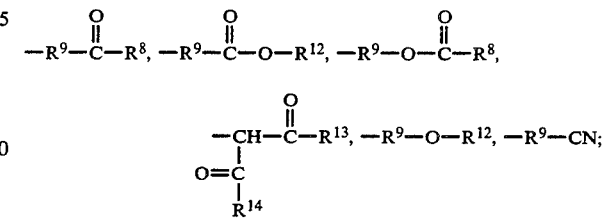

R$^2$ is at each independent occurrence selected from alkyl, alkenyl, cycloalkyl, cycloalkenyl,

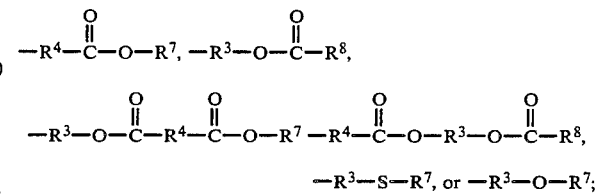

—R$^3$—S—R$^7$, or —R$^3$—O—R$^7$;

R$^3$ is at each independent occurrence selected from alkylene of at least 2 carbon atoms, alkenylene of at least 2 carbon atoms, cycloalkylene, or cycloalkenylene;

R$^4$ is at each independent occurrence selected from alkylene, alkenylene, cycloalkylene, or cycloalkenylene;

R$^6$ is at each independent occurrence selected from a carbon-carbon bond, or R$^4$;

R$^7$ is at each independent occurrence selected from —H or R$^8$;

R$^8$ is at each independent occurrence selected from alkyl, alkenyl, cycloalkyl, or cycloalkenyl;

R$^9$ is at each independent occurrence selected from C$_1$ to C$_4$ alkylene;

R$^{12}$ is at each independent occurrence selected from —H or a monovalent C$_1$ to C$_{20}$ hydrocarbon radical;

R$^{13}$ and R$^{14}$ are at each independent occurrence selected from C$_1$ to C$_{20}$ alkyl or C$_1$ to C$_{20}$ alkoxy;

at each independent occurrence n=1 or 2 and p=4−n;

at each independent occurrence a=1 or 2; b=2−a; c=1 or 2; d=3−c; and q=0 or an integer from 1 to 4 inclusive; and v is at each independent occurrence selected from an integer from 1 to 8 inclusive.

4. The composition of claim 1 wherein the diester of an ethylenically unsaturated dicarboxylic acid is a diester or mixture of diesters having the formula:

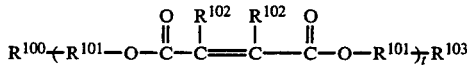

where
R$^{100}$ and R$^{103}$ are the same or different and are at each independent occurrence alkyl, alkenyl, cycloalkyl, cycloalkenyl, or a multivalent hydrocarbyl or hydroxyl-substituted hydrocarbyl group;

R$^{101}$ is at each independent occurrence a carbon-oxygen bond, alkylene or alkenylene with the proviso that the total carbon atoms in each of R$^{100}$ plus R$^{101}$ and R$^{103}$ plus R$^{101}$ is from 1 to 10;

R$^{102}$ is at each independent occurrence selected from hydrogen, alkyl and alkylene; and t is an integer of from 1 to about 20.

5. The composition of claim 4 wherein the diester is a di($C_1$–$C_{10}$ alkyl) maleate.

6. The composition of claim 5 wherein the dialkyl maleate is dibutyl maleate.

7. The composition of claim 3 wherein the organotin mercaptide is an alkyltin alkythioalkanoate.

8. The composition of claim 3 wherein the organotin mercaptide is an alkyltin mercaptoalkylalkanoate.

9. The composition of claim 3 wherein the organotin mercaptide is a mixture of a monoalkytin tris(alkylthioalkanoate) and a dialkyltin bis(alkylthioalkanoate).

10. The composition of claim 3 wherein the organotin mercaptide is a bis(alkyltin alkylthioalkanoate) sulfide.

11. The composition of claim 10 wherein the organotin mercaptide is a mixture of a bis(monoalkyltin di(alkylthioalkanoate))sulfide and a bis(dialkyltin mono(alkylthioalkanoate)) sulfide.

12. The composition of claim 11 wherein the organotin mercaptide is a mixture of bis(monomethyltin di(isooctylthioglycolate)) sulfide and bis(dimethyltin mono(isooctylthioglycolate))sulfide.

13. The composition of claim 3 wherein the organotin mercaptide is a bis(alkyltin mercaptoalkylalkanoate)sulfide.

14. The composition of claim 13 wherein the organotin mercaptide is a mixture of a bis(monoalkyltin di(mercaptoalkylalkanoate)) sulfide and a bis(dialkyltin mono(mercaptoalkylalkanoate)) sulfide.

15. The composition of claim 14 wherein the organotin mercaptide is a mixture of bis(monomethyltin di(mercaptoethyloleate))sulfide and bis(dimethyltin mono(mercaptoethyloleate))sulfide.

16. The composition of claim 3 wherein the organotin mercaptide is an alkyltin alkylmercaptide.

17. The composition of claim 16 wherein the alkyltin alkylmercaptide is dibutyltin bis(lauryl mercaptide).

18. The composition of claim 1 wherein the molar ratio of the organotin compound of component A to the diester of component B is from about 2/1 to about 1/8.

19. The composition of claim 1 wherein the molar ratio of the organotin compound of component A to the diester of component B is about 1/2 to about 1/6.

20. The composition according to claim 18 wherein the organotin compound of component A is a mixture a monomethyltin tris(isooctylthioglycolate) and dimethyltin bis(isooctylthioglycolate) and the diester of component B is dibutyl maleate.

21. A composition comprising a halogen-containing organic polymer and, in an amount sufficient to stabilize said polymer against the deteriorative effects of heat, light and weathering, a stabilizer composition according to claim 1.

22. A composition according to claim 21 which contains about 1.0% to about 5.0% of the stabilizer composition, the percentages being by weight based on the weight of the halogen-containing organic polymer.

23. A composition capable of stabilizing halogen-containing organic polymers against the deteriorative effects of heat, light and weathering, said composition comprising the product produced by combining:

A. an organotin compound or mixture of organotin compounds selected from the group consisting of organotin sulfides, organotin mercaptides and mixtures thereof;

B. in an amount sufficient to synergize the stabilization of the halogen-containing organic polymer but insufficient to plasticize said polymer, a diester of an ethylenically unsaturated dicarboxylic acid having one carboxyl group on each carbon atom of the ethenylene group and 1 to 10 carbon atoms in the alcohol portion of the ester moieties; and C. in an amount sufficient to synergize the stabilization of the halogen-containing organic polymer, an organotin carboxylate or mixture of organotin carboxylates.

24. The composition of claim 23 wherein the organotin compound of component A is an organotin sulfide or mixture of organotin sulfides having the formula

where R is at each independent occurrence selected from alkyl, alkenyl, cycloalkyl, cycloalkenyl,

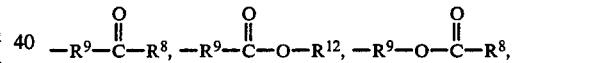

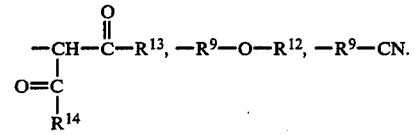

25. The composition of claim 21 wherein the organotin compound of component A is an organotin mercaptide or mixture of organotin mercaptides having the formulas:

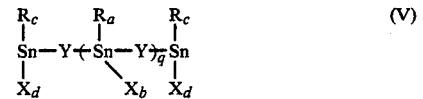

where
X is at each independent occurrence selected from

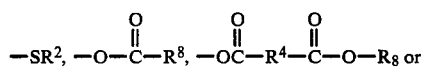

-continued

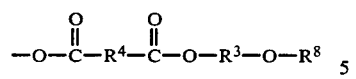

with the proviso that; (1) at least one X in formulas III and IV is —SR$^2$ and (2) in formula V at least one X is —SR$^2$ or at least one Y is —S—R$^3$—W

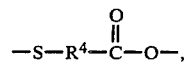

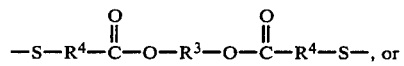

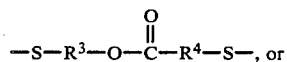

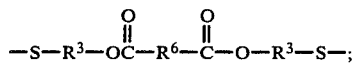

Y is at each independent occurrence selected from

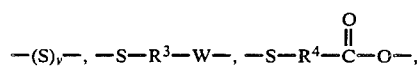

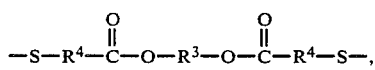

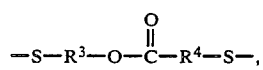

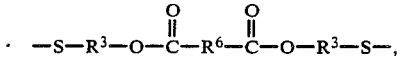

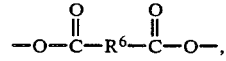

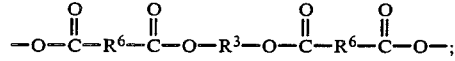

W is at each independent occurrence selected from oxygen or sulfur;

R is at each independent occurrence selected from alkyl, alkenyl, cycloalkyl, cycloalkenyl,

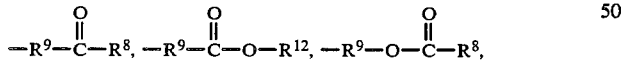

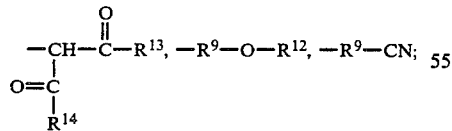

R$^2$ is at each independent occurrence selected from alkyl, alkenyl, cycloalkyl, cycloalkenyl,

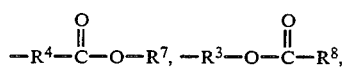

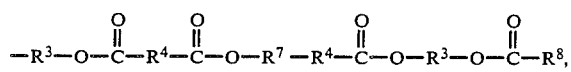

—R$^3$—S—R$^7$, or —R$^3$—O—R$^7$;

R$^3$ is at each independent occurrence selected from alkylene of at least 2 carbon atoms, alkenylene of at least 2 carbon atoms, cycloalkylene, or cycloalkenylene;

R$^4$ is at each independent occurrence selected from alkylene, alkenylene, cycloalkylene, or cycloalkenylene;

R$^6$ is at each independent occurrence selected from a carbon-carbon bond, or R$^4$;

R$^7$ is at each independent occurrence selected from —H or R$^8$;

R$^8$ is at each independent occurrence selected from alkyl, alkenyl, cycloalkyl, or cycloalkenyl;

R$^9$ is at each independent occurrence selected from C$_1$ to C$_4$ alkylene;

R$^{12}$ is at each independent occurrence selected from —H or a monovalent C$_1$ to C$_{20}$ hydrocarbon radical;

R$^{13}$ and R$^{14}$ are at each independent occurrence selected from C$_1$ to C$_{20}$ alkyl or C$_1$ to C$_{20}$ alkoxy;

at each independent occurrence n=1 or 2 and p=4—n;

at each independent occurrence a=1 or 2; b=2—a; c=1 or 2; d=3—c; and q=0 or an integer from 1 to 4 inclusive; and v is at each independent occurrence selected from an integer from 1 to 8 inclusive.

26. The composition of claim 23 wherein the diester of an ethylenically unsaturated dicarboxylic acid is a diester or mixture of diesters having the formula:

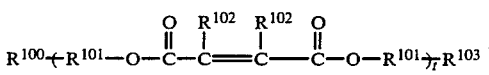

where

R$^{100}$ and R$^{103}$ are the same or different and are at each independent occurrence alkyl, alkenyl, cycloalkyl, cycloalkenyl, or a multivalent hydrocarbyl or hydroxyl-substituted hydrocarbyl group;

R$^{101}$ is at each independent occurrence a carbon-oxygen bond, alkylene or alkenylene with the proviso that the total carbon atoms in each of R$^{100}$ plus R$^{101}$ and R$^{103}$ plus R$^{101}$ is from 1 to 10;

R$^{102}$ is at each independent occurrence selected from hydrogen, alkyl and alkylene; and t is an integer of from 1 to about 20.

27. The composition of claim 21 wherein the diester is a di(C$_1$–C$_{10}$ alkyl) maleate.

28. The composition of claim 27 wherein the dialkyl maleate is dibutyl maleate.

29. The composition of claim 25 wherein the organotin mercaptide is an alkyltin alkylthioalkanoate.

30. The composition of claim 25 wherein the organotin mercaptide is an alkyltin mercaptoalkylalkanoate.

31. The composition of claim 25 wherein the organotin mercaptide is a mixture of a monoalkyltin tris(alkylthioalkanoate) and a dialkyltin bis(alkylthioalkanoate).

32. The composition of claim 25 wherein the organotin mercaptide is a bis(alkyltin alkylthioalkanoate)sulfide.

33. The composition of claim 32 wherein the organotin mercaptide is a mixture of a bis(monoalkyltin di(alkylthioalkanoate))sulfide and a bis(dialkyltin mono(alkylthioalkanoate))sulfide.

34. The composition of claim 33 wherein the organotin mercaptide is a mixture of bis(monomethyltin di(isooctylthioglycolate))sulfide and bis(dimethyltin mono(isooctylthioglycolate))sulfide.

35. The composition of claim 25 wherein the organotin mercaptide is a bis(alkyltin mercaptoalkylalkanoate)-sulfide.

36. The composition of claim 35 wherein the organotin mercaptide is a mixture of a bis(monoalkyltin di(mercaptoalkylalkanoate))sulfide and a bis(dialkyltin mono(-mercaptoalkylalkanoate)sulfide.

37. The composition of claim 36 wherein the organotin mercaptide is a mixture of bis(monomethyltin di(-mercaptoethyloleate))sulfide and bis(dimethyltin mono(mercaptoethyloleate))sulfide.

38. The composition of claim 25 wherein the organotin mercaptide is in alkyltin alkylmercaptide.

39. The composition of claim 38 wherein the alkyltin alkylmercaptide is dibutyltin bis(lauryl mercaptide).

40. The composition of claim 21 wherein the organotin carboxylate or mixture of organotin carboxylates has the formula:

$$R_n\text{—Sn—}Z_p \quad (VII)$$

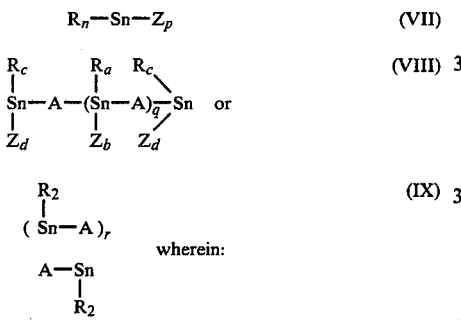

(VIII)

(IX)

wherein:

R is at each independent occurrence selected from alkyl, alkenyl, cycloalkyl, cycloalkenyl,

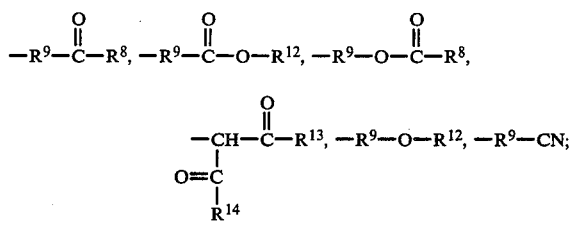

Z is

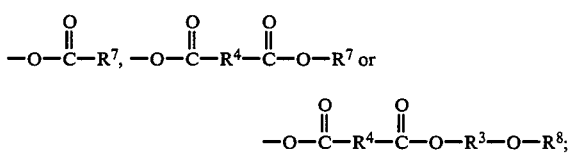

A is

 or $$-O-\overset{O}{\overset{\|}{C}}-R^4-\overset{O}{\overset{\|}{C}}-O-R^3-O\overset{O}{\overset{\|}{C}}-R^4-\overset{O}{\overset{\|}{C}}-O-;$$

$R^3$ is at each independent occurrence selected from alkylene of at least 2 carbon atoms, alkenylene of at least 2 carbon atoms, cycloalkylene, or cycloalkenylene;

$R^4$ is at each independent occurrence selected from alkylene, alkenylene, cycloalkylene, or cycloalkenylene;

$R^7$ is at each independent occurrence selected from —H or $R^8$;

$R^8$ is at each independent occurrence selected from alkyl, alkenyl, cycloalkyl, or cycloalkenyl;

$R^9$ is at each independent occurrence selected from $C_1$ to $C_4$ alkylene;

$R^{12}$ is at each independent occurrence selected from —H or a monovalent $C_1$ to $C_{20}$ hydrocarbon radical;

$R^{13}$ and $R^{14}$ are at each independent occurrence selected from $C_1$ to $C_{20}$ alkyl or $C_1$ to $C_{20}$ alkoxy;

at each independent occurrence n=1 or 2 and p=4−n;

at each independent occurrence a=1 or 2; b=2−a; c=1 or 2; d=3−c; and q=0 or an integer from 1 to 4 inclusive; and r=0 or an interger from 1 to about 20.

41. The composition of claim 40 wherein the organotin carboxylate is an alkyltin alkyl maleate.

42. The composition of claim 41 wherein the alkyltin alkyl maleate is dibutyltin bis(butyl maleate).

43. The composition of claim 23 wherein the molar ratio of the organotin compounds from components A and C to diesters of component B is about 2/1 to about 1/8.

44. The composition of claim 23 wherein the molar ratio of the organotin compounds from components A and C to diesters of component B is about 1/2 to about 1/6.

45. The composition of claim 41 wherein the molar ratio of the organotin compounds of component A to the organotin carboxylates of component C is about 1/1 to about 1/5.

46. The composition of claim 42 wherein the molar ratio of the organotin compounds of component A to the organotin carboxylates of component C is about 1/1 to about 1/5.

47. The composition of claim 42 wherein the organotin compound of component A is a mixture of monomethyltin tris(issooctylthioglycolate) and dimethyltin bis(isooctylthioglycolate), the diester of component B is dibutyl maleate, and the organotin carboxylate of component C is dibutyltin bis(butyl maleate).

48. The composition of claim 42 wherein the organotin compound of component A is dibutyltin bis(lauryl mercaptide), the diester of component B is dibutyl maleate, and the organotin carboxylate of component C is dibutyltin bis(butyl maleate).

49. A composition comprising a halogen-containing organic polymer and, in an amount sufficient to stabilize said polymer against the deteriorative effects of heat, light and weathering, a stabilizer composition according to claim 21.

50. A composition according to claim 49 which contains about 1.0% to about 5.0% of the stabilizer composition, the percentages being by weight based on the weight of the halogen-containing organic polymer.

* * * * *